US011097238B2

(12) United States Patent
Stegemoeller et al.

(10) Patent No.: US 11,097,238 B2
(45) Date of Patent: Aug. 24, 2021

(54) BLENDER UNIT WITH INTEGRATED CONTAINER SUPPORT FRAME

(71) Applicant: Halliburton Energy Services, Inc., Houston, TX (US)

(72) Inventors: Calvin L. Stegemoeller, Duncan, OK (US); Bryan Chapman Lucas, Duncan, OK (US); Bryan John Lewis, Duncan, OK (US); Austin Carl Schaffner, Duncan, OK (US); Timothy H. Hunter, Duncan, OK (US); Jim Basuki Surjaatmadja, Duncan, OK (US); Wesley John Warren, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/741,862

(22) Filed: Jan. 14, 2020

(65) Prior Publication Data

US 2020/0147566 A1 May 14, 2020

Related U.S. Application Data

(62) Division of application No. 15/548,485, filed as application No. PCT/US2015/041573 on Jul. 22, 2015, now Pat. No. 10,569,242.

(51) Int. Cl.
*E21B 21/06* (2006.01)
*B01F 15/02* (2006.01)
(Continued)

(52) U.S. Cl.
CPC ........... *B01F 15/0243* (2013.01); *B01F 3/12* (2013.01); *B01F 5/0065* (2013.01); *B01F 7/16* (2013.01);
(Continued)

(58) Field of Classification Search
CPC ...................................................... E21B 21/062
(Continued)

(56) References Cited

U.S. PATENT DOCUMENTS

| 710,611 A | 10/1902 | Ray |
| 917,646 A | 4/1909 | Otto |

(Continued)

FOREIGN PATENT DOCUMENTS

| EP | 2937826 A1 | 10/2015 |
| GB | 2066220 A | 7/1981 |

(Continued)

OTHER PUBLICATIONS

International Search Report and Written Opinion issued in related PCT Application No. PCT/US2015/041573 dated Jan. 4, 2016, 15 pages.

(Continued)

*Primary Examiner* — David L Sorkin
(74) *Attorney, Agent, or Firm* — John Wustenberg; Baker Botts L.L.P.

(57) ABSTRACT

Systems and methods for managing bulk material efficiently at a well site are provided. The disclosure is directed to a container support frame that is integrated into a blender unit. The support frame is used to receive one or more portable containers of bulk material, and the blender unit may include a gravity feed outlet for outputting bulk material from the containers directly into a mixer of the blender unit. The blender unit with integrated support frame may eliminate the need for any subsequent mechanical conveyance of the bulk material (e.g., via a separate mechanical conveying system or on-blender sand screws) from the containers to the mixer. As such, the integrated blender unit may be lighter weight, take up less space, and have a lower cost and complexity than existing blenders.

20 Claims, 4 Drawing Sheets

(51) Int. Cl.
*B01F 5/00* (2006.01)
*B01F 13/10* (2006.01)
*B01F 3/12* (2006.01)
*B01F 7/16* (2006.01)
*B65D 88/32* (2006.01)

(52) U.S. Cl.
CPC ...... *B01F 13/1005* (2013.01); *B01F 13/1022* (2013.01); *B01F 15/0234* (2013.01); *B01F 15/0235* (2013.01); *B01F 15/0283* (2013.01); *B65D 88/32* (2013.01); *E21B 21/06* (2013.01); *E21B 21/062* (2013.01); *B01F 3/1207* (2013.01)

(58) Field of Classification Search
USPC ..................................... 366/183.1; 166/305.1
See application file for complete search history.

(56) References Cited

U.S. PATENT DOCUMENTS

| | | |
|---|---|---|
| 1,519,153 A | 9/1923 | Mitton |
| 1,726,603 A | 9/1929 | Wallace |
| 1,795,987 A | 3/1931 | Adams |
| 1,798,423 A | 3/1931 | Vogel-Jorgensen |
| 2,172,244 A | 9/1939 | Grundler |
| 2,231,911 A | 2/1941 | Hitt et al. |
| 2,281,497 A | 4/1942 | Hyson et al. |
| 2,385,245 A | 9/1945 | Willoughby |
| 2,415,782 A | 2/1947 | Zademach |
| 2,513,012 A | 6/1950 | Dugas |
| 2,563,470 A | 8/1951 | Kane |
| 2,652,174 A | 9/1953 | Shea |
| 2,670,866 A | 3/1954 | Glesby |
| 2,678,737 A | 5/1954 | Mangrum |
| 2,703,659 A | 3/1955 | Hutchins |
| 2,756,073 A | 7/1956 | Bridge |
| 2,756,544 A | 7/1956 | Rosgen |
| 2,759,737 A | 8/1956 | Manning |
| 2,802,603 A | 8/1957 | McCray |
| 2,867,336 A | 1/1959 | Soldini et al. |
| 3,049,248 A | 8/1962 | Heltzel et al. |
| 3,083,879 A | 4/1963 | Coleman |
| 3,151,779 A | 10/1964 | Rensch et al. |
| 3,203,370 A | 8/1965 | Friedrich et al. |
| 3,217,927 A | 11/1965 | Bale, Jr. et al. |
| 3,315,826 A | 4/1967 | Gardner |
| 3,318,473 A | 5/1967 | Jones et al. |
| 3,326,572 A | 6/1967 | Murray |
| 3,343,688 A | 9/1967 | Ross |
| 3,354,918 A | 11/1967 | Coleman |
| 3,404,963 A | 10/1968 | Fritsche et al. |
| 3,432,151 A | 3/1969 | O'Loughlin et al. |
| 3,467,408 A | 9/1969 | Regalia |
| 3,476,270 A | 11/1969 | Cox et al. |
| 3,602,400 A * | 8/1971 | Cooke ............... B65D 88/128 222/143 |
| 3,627,555 A | 12/1971 | Driscoll |
| 3,698,693 A | 10/1972 | Poncet |
| 3,785,534 A | 1/1974 | Smith |
| 3,802,584 A | 4/1974 | Sackett, Sr. et al. |
| 3,856,275 A | 12/1974 | Dydzyk |
| 3,986,708 A | 10/1976 | Heltzel et al. |
| 4,023,719 A | 5/1977 | Noyon |
| 4,058,239 A | 11/1977 | Van Mill |
| 4,138,163 A | 2/1979 | Calvert et al. |
| 4,178,117 A | 12/1979 | Brugler |
| 4,204,773 A | 5/1980 | Bates |
| 4,248,337 A | 2/1981 | Zimmer |
| 4,258,953 A | 3/1981 | Johnson |
| 4,311,395 A | 1/1982 | Douthitt et al. |
| 4,313,708 A | 2/1982 | Tiliakos |
| 4,395,052 A | 7/1983 | Rash |
| 4,398,653 A | 8/1983 | Daloisio |
| 4,423,884 A | 1/1984 | Gevers |
| 4,453,829 A | 6/1984 | Althouse, III |
| 4,490,047 A | 12/1984 | Stegemoeller et al. |
| 4,544,279 A | 10/1985 | Rudolph |
| 4,548,507 A | 10/1985 | Mathis et al. |
| 4,583,663 A | 4/1986 | Bonerb |
| 4,626,166 A | 12/1986 | Jolly |
| 4,701,095 A | 10/1987 | Berryman et al. |
| 4,802,141 A | 1/1989 | Stegemoeller et al. |
| 4,806,065 A | 2/1989 | Holt et al. |
| 4,850,701 A | 7/1989 | Stegemoeller et al. |
| 4,850,702 A | 7/1989 | Arribau et al. |
| 4,854,714 A | 8/1989 | Davis et al. |
| 4,856,681 A | 8/1989 | Murray |
| 4,900,157 A | 2/1990 | Stegemoeller et al. |
| 4,919,540 A | 4/1990 | Stegemoeller et al. |
| 4,956,821 A * | 9/1990 | Fenelon ............... B28C 7/067 366/16 |
| 4,993,883 A | 2/1991 | Jones |
| 4,997,335 A | 3/1991 | Prince |
| 5,036,979 A | 8/1991 | Selz |
| 5,096,096 A | 3/1992 | Calaunan |
| 5,114,169 A | 5/1992 | Botkin et al. |
| 5,149,192 A | 9/1992 | Hamm et al. |
| 5,303,998 A | 4/1994 | Whitlatch et al. |
| 5,339,996 A | 8/1994 | Dubbert et al. |
| 5,343,813 A | 9/1994 | Septer |
| 5,375,730 A | 12/1994 | Bahr et al. |
| 5,401,129 A | 3/1995 | Eatinger |
| 5,413,154 A | 5/1995 | Hurst, Jr. et al. |
| 5,426,137 A | 6/1995 | Allen |
| 5,441,321 A | 8/1995 | Karpisek |
| 5,443,350 A | 8/1995 | Wilson |
| 5,445,289 A | 8/1995 | Owen |
| 5,590,976 A | 1/1997 | Kilheffer et al. |
| 5,722,552 A | 3/1998 | Olson |
| 5,772,390 A | 6/1998 | Walker |
| 5,806,441 A | 9/1998 | Chung |
| 5,913,459 A | 6/1999 | Gill et al. |
| 5,915,913 A | 6/1999 | Greenlaw et al. |
| 5,927,356 A | 7/1999 | Henderson |
| 5,944,470 A | 8/1999 | Bonerb |
| 5,997,099 A | 12/1999 | Collins |
| 6,059,372 A | 5/2000 | McDonald et al. |
| 6,112,946 A | 9/2000 | Bennett et al. |
| 6,126,307 A | 10/2000 | Black et al. |
| 6,193,402 B1 | 2/2001 | Grimland et al. |
| 6,247,594 B1 | 6/2001 | Garton |
| 6,379,086 B1 | 4/2002 | Goth |
| 6,425,627 B1 | 7/2002 | Gee |
| 6,491,421 B2 | 12/2002 | Rondeau et al. |
| 6,517,232 B1 | 2/2003 | Blue |
| 6,536,939 B1 | 3/2003 | Blue |
| 6,537,015 B2 | 3/2003 | Lim et al. |
| 6,568,567 B2 | 5/2003 | McKenzie et al. |
| 6,622,849 B1 | 9/2003 | Sperling |
| 6,655,548 B2 | 12/2003 | McClure, Jr. et al. |
| 6,876,904 B2 | 4/2005 | Oberg et al. |
| 6,980,914 B2 | 12/2005 | Bivens et al. |
| 7,008,163 B2 | 3/2006 | Russell |
| 7,086,342 B2 | 8/2006 | O'Neall et al. |
| 7,100,896 B1 | 9/2006 | Cox |
| 7,114,905 B2 | 10/2006 | Dibdin |
| 7,252,309 B2 | 8/2007 | Eng Soon et al. |
| 7,284,579 B2 | 10/2007 | Elgan |
| 7,451,015 B2 | 11/2008 | Mazur et al. |
| 7,475,796 B2 | 1/2009 | Garton |
| 7,500,817 B2 | 3/2009 | Furrer et al. |
| 7,513,280 B2 | 4/2009 | Brashears et al. |
| 7,665,788 B2 | 2/2010 | Dibdin et al. |
| 7,762,281 B2 | 7/2010 | Schuld |
| 7,997,213 B1 | 8/2011 | Gauthier et al. |
| 8,387,824 B2 | 3/2013 | Wietgrefe |
| 8,434,990 B2 | 5/2013 | Claussen |
| D688,349 S | 8/2013 | Oren et al. |
| D688,350 S | 8/2013 | Oren et al. |
| D688,351 S | 8/2013 | Oren et al. |
| D688,772 S | 8/2013 | Oren et al. |
| 8,505,780 B2 | 8/2013 | Oren |
| 8,545,148 B2 | 10/2013 | Wanek-Pusset et al. |

(56) References Cited

U.S. PATENT DOCUMENTS

| | | |
|---|---|---|
| 8,573,917 B2 | 11/2013 | Renyer |
| 8,585,341 B1 | 11/2013 | Oren |
| 8,607,289 B2 | 12/2013 | Brown et al. |
| 8,616,370 B2 | 12/2013 | Allegretti et al. |
| 8,622,251 B2 * | 1/2014 | Oren .................. B65G 65/23 222/185.1 |
| 8,662,525 B1 | 3/2014 | Dierks et al. |
| 8,668,430 B2 | 3/2014 | Oren et al. |
| D703,582 S | 4/2014 | Oren |
| 8,827,118 B2 | 9/2014 | Oren |
| 8,834,012 B2 | 9/2014 | Case et al. |
| 8,840,298 B2 | 9/2014 | Stegemoeller et al. |
| 8,844,615 B2 * | 9/2014 | Luharuka .............. E21B 43/267 166/270.1 |
| 8,887,914 B2 | 11/2014 | Allegretti et al. |
| RE45,713 E | 10/2015 | Oren et al. |
| 9,162,603 B2 | 10/2015 | Oren |
| RE45,788 E | 11/2015 | Oren et al. |
| 9,248,772 B2 | 2/2016 | Oren |
| RE45,914 E | 3/2016 | Oren et al. |
| 9,296,518 B2 | 3/2016 | Oren |
| 9,322,138 B2 | 4/2016 | Villalobos Davila |
| 9,340,353 B2 | 5/2016 | Oren et al. |
| 9,358,916 B2 | 6/2016 | Oren |
| 9,394,102 B2 | 7/2016 | Oren et al. |
| 9,403,626 B2 | 8/2016 | Oren |
| 9,421,899 B2 | 8/2016 | Oren |
| 9,440,785 B2 | 9/2016 | Oren et al. |
| 9,446,801 B1 | 9/2016 | Oren |
| 9,475,661 B2 | 10/2016 | Oren |
| 9,511,929 B2 | 12/2016 | Oren |
| 9,522,816 B2 | 12/2016 | Taylor |
| 9,527,664 B2 | 12/2016 | Oren |
| 9,580,238 B2 | 2/2017 | Friesen et al. |
| RE46,334 E | 3/2017 | Oren et al. |
| 9,617,065 B2 | 4/2017 | Allegretti et al. |
| 9,617,066 B2 | 4/2017 | Oren |
| 9,624,030 B2 | 4/2017 | Oren et al. |
| 9,624,036 B2 | 4/2017 | Luharuka et al. |
| 9,643,774 B2 | 5/2017 | Oren |
| 9,650,216 B2 | 5/2017 | Allegretti |
| 9,656,799 B2 | 5/2017 | Oren et al. |
| 9,669,993 B2 | 6/2017 | Oren et al. |
| 9,670,752 B2 | 6/2017 | Glynn et al. |
| 9,676,554 B2 | 6/2017 | Glynn et al. |
| 9,682,815 B2 | 6/2017 | Oren |
| 9,694,970 B2 | 7/2017 | Oren et al. |
| 9,701,463 B2 | 7/2017 | Oren et al. |
| 9,718,609 B2 | 8/2017 | Oren et al. |
| 9,718,610 B2 | 8/2017 | Oren |
| 9,725,233 B2 | 8/2017 | Oren et al. |
| 9,725,234 B2 | 8/2017 | Oren et al. |
| 9,738,439 B2 | 8/2017 | Oren et al. |
| RE46,531 E | 9/2017 | Oren et al. |
| 9,758,081 B2 | 9/2017 | Oren |
| 9,758,993 B1 | 9/2017 | Allegretti et al. |
| 9,771,224 B2 | 9/2017 | Oren et al. |
| 9,783,338 B1 | 10/2017 | Allegretti et al. |
| 9,796,319 B1 | 10/2017 | Oren |
| 9,796,504 B1 | 10/2017 | Allegretti et al. |
| 9,809,381 B2 | 11/2017 | Oren et al. |
| 9,828,135 B2 | 11/2017 | Allegretti et al. |
| 9,840,366 B2 | 12/2017 | Oren et al. |
| 9,969,564 B2 | 5/2018 | Oren et al. |
| 9,988,182 B2 | 6/2018 | Allegretti et al. |
| 10,059,246 B1 | 8/2018 | Oren |
| 10,081,993 B2 | 9/2018 | Walker et al. |
| 10,189,599 B2 | 1/2019 | Allegretti et al. |
| 10,207,753 B2 | 2/2019 | O'Marra et al. |
| 10,287,091 B2 | 5/2019 | Allegretti |
| 10,308,421 B2 | 6/2019 | Allegretti |
| 10,486,854 B2 | 11/2019 | Allegretti et al. |
| 10,518,828 B2 | 12/2019 | Oren et al. |
| 10,604,338 B2 | 3/2020 | Allegretti |
| 2002/0121464 A1 | 9/2002 | Soldwish-Zoole et al. |
| 2003/0159310 A1 | 8/2003 | Hensley et al. |
| 2004/0008571 A1 | 1/2004 | Coody et al. |
| 2004/0031335 A1 | 2/2004 | Fromme et al. |
| 2004/0206646 A1 | 10/2004 | Goh et al. |
| 2004/0258508 A1 | 12/2004 | Jewell |
| 2005/0219941 A1 | 10/2005 | Christenson et al. |
| 2006/0013061 A1 | 1/2006 | Bivens et al. |
| 2007/0014185 A1 * | 1/2007 | Diosse .................. B01F 5/241 366/9 |
| 2007/0201305 A1 | 8/2007 | Heilman et al. |
| 2008/0187423 A1 | 8/2008 | Mauchle |
| 2008/0294484 A1 | 11/2008 | Furman et al. |
| 2009/0078410 A1 | 3/2009 | Krenek et al. |
| 2009/0129903 A1 | 5/2009 | Lyons, III |
| 2009/0292572 A1 | 11/2009 | Alden et al. |
| 2009/0314791 A1 | 12/2009 | Hartley et al. |
| 2010/0025041 A1 | 2/2010 | Phillippi et al. |
| 2010/0319921 A1 | 12/2010 | Eia et al. |
| 2011/0061855 A1 | 3/2011 | Case et al. |
| 2011/0272155 A1 | 11/2011 | Warren |
| 2011/0299357 A1 * | 12/2011 | Vasshus ................ B01F 3/0865 366/132 |
| 2012/0017812 A1 | 1/2012 | Renyer et al. |
| 2012/0018093 A1 | 1/2012 | Zuniga et al. |
| 2012/0037231 A1 | 2/2012 | Janson |
| 2012/0181093 A1 | 7/2012 | Fehr et al. |
| 2012/0219391 A1 | 8/2012 | Teichrob et al. |
| 2013/0135958 A1 | 5/2013 | O'Callaghan |
| 2013/0142601 A1 | 6/2013 | McIver et al. |
| 2013/0206415 A1 | 8/2013 | Sheesley |
| 2013/0284729 A1 | 10/2013 | Cook et al. |
| 2014/0020765 A1 * | 1/2014 | Oren .................. B65G 65/40 137/1 |
| 2014/0023463 A1 | 1/2014 | Oren |
| 2014/0023464 A1 | 1/2014 | Oren et al. |
| 2014/0044508 A1 | 2/2014 | Luharuka et al. |
| 2014/0069650 A1 | 3/2014 | Stegemoeller et al. |
| 2014/0083554 A1 | 3/2014 | Harris |
| 2014/0216736 A1 | 8/2014 | Leugemors et al. |
| 2014/0299226 A1 | 10/2014 | Oren et al. |
| 2014/0305769 A1 | 10/2014 | Eiden, III et al. |
| 2014/0377042 A1 | 12/2014 | McMahon |
| 2015/0003943 A1 | 1/2015 | Oren et al. |
| 2015/0003955 A1 | 1/2015 | Oren et al. |
| 2015/0016209 A1 | 1/2015 | Barton et al. |
| 2015/0183578 A9 | 7/2015 | Oren et al. |
| 2015/0191318 A1 | 7/2015 | Martel |
| 2015/0284194 A1 | 10/2015 | Oren et al. |
| 2015/0353293 A1 | 12/2015 | Richard |
| 2015/0366405 A1 | 12/2015 | Manchuliantsau |
| 2015/0368052 A1 | 12/2015 | Sheesley |
| 2015/0375930 A1 | 12/2015 | Oren et al. |
| 2016/0031658 A1 | 2/2016 | Oren et al. |
| 2016/0039433 A1 | 2/2016 | Oren et al. |
| 2016/0046438 A1 | 2/2016 | Oren et al. |
| 2016/0046454 A1 | 2/2016 | Oren et al. |
| 2016/0068342 A1 | 3/2016 | Oren et al. |
| 2016/0096154 A1 | 4/2016 | Hideaki Kuada |
| 2016/0130095 A1 | 5/2016 | Oren et al. |
| 2016/0244279 A1 | 8/2016 | Oren et al. |
| 2016/0264352 A1 | 9/2016 | Oren |
| 2016/0332809 A1 | 11/2016 | Harris |
| 2016/0332811 A1 | 11/2016 | Harris |
| 2017/0021318 A1 | 1/2017 | McIver et al. |
| 2017/0129696 A1 | 5/2017 | Oren |
| 2017/0144834 A1 | 5/2017 | Oren et al. |
| 2017/0203915 A1 | 7/2017 | Oren |
| 2017/0217353 A1 | 8/2017 | Vander Pol et al. |
| 2017/0217671 A1 | 8/2017 | Allegretti |
| 2017/0225883 A1 | 8/2017 | Oren |
| 2017/0240350 A1 | 8/2017 | Oren et al. |
| 2017/0240361 A1 | 8/2017 | Glynn et al. |
| 2017/0240363 A1 | 8/2017 | Oren |
| 2017/0267151 A1 | 9/2017 | Oren |
| 2017/0283165 A1 | 10/2017 | Oren et al. |
| 2017/0313497 A1 | 11/2017 | Schaffner et al. |
| 2017/0327326 A1 | 11/2017 | Lucas et al. |
| 2017/0334639 A1 | 11/2017 | Hawkins et al. |
| 2017/0349226 A1 | 12/2017 | Oren et al. |

(56) References Cited

U.S. PATENT DOCUMENTS

| | | |
|---|---|---|
| 2018/0257814 A1 | 9/2018 | Allegretti et al. |
| 2019/0009231 A1 | 1/2019 | Warren et al. |
| 2019/0111401 A1 | 4/2019 | Lucas et al. |
| 2020/0062448 A1 | 2/2020 | Allegretti et al. |

FOREIGN PATENT DOCUMENTS

| | | |
|---|---|---|
| GB | 2204847 A1 | 11/1988 |
| JP | 2008239019 A | 10/2008 |
| WO | 2008012513 A2 | 1/2008 |
| WO | 2013095871 A1 | 6/2013 |
| WO | 2013142421 A1 | 9/2013 |
| WO | 2014018129 A1 | 1/2014 |
| WO | 2014018236 A2 | 5/2014 |
| WO | 2014/085030 A2 | 6/2014 |
| WO | 2015119799 A1 | 8/2015 |
| WO | 2015191150 A1 | 12/2015 |
| WO | 2015192061 A1 | 12/2015 |
| WO | 2016044012 A1 | 3/2016 |
| WO | 2016160067 A1 | 10/2016 |
| WO | 2016/178695 A1 | 11/2016 |
| WO | 20171027034 A1 | 2/2017 |

OTHER PUBLICATIONS

International Preliminary Report on Patentability issued in related PCT Application No. PCT/US2015/041573 dated Feb. 1, 2018 12 pages.
Office Action issued in related Canadian Patent Application No. 2,996,055 dated Oct. 2, 2020, 5 pages.
U.S. Pat. No. 0,802,254A, Oct. 17, 1905, "Can-Cooking Apparatus," John Baker et al.

* cited by examiner

BLENDER UNIT WITH INTEGRATED CONTAINER SUPPORT FRAME

CROSS REFERENCE TO RELATED APPLICATIONS

The present application is a Divisional of U.S. patent application Ser. No. 15/548,485 filed Aug. 3, 2017, which is a U.S. National Stage Application of International Application No. PCT/US2015/041573 filed Jul. 22, 2015, both of which are incorporated herein by reference in their entirety for all purposes.

TECHNICAL FIELD

The present disclosure relates generally to transferring dry bulk materials, and more particularly, to a bulk material container support frame integrated with a blender unit.

BACKGROUND

During the drilling and completion of oil and gas wells, various wellbore treating fluids are used for a number of purposes. For example, high viscosity gels are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the well site as they are needed for the particular treatment. Systems for metering and mixing the various materials are normally portable, e.g., skid- or truck-mounted, since they are needed for only short periods of time at a well site.

The powder or granular treating material is normally transported to a well site in a commercial or common carrier tank truck. Once the tank truck and mixing system are at the well site, the dry powder material (bulk material) must be transferred or conveyed from the tank truck into a supply tank for metering into a blender as needed. The bulk material is usually transferred from the tank truck pneumatically. More specifically, the bulk material is blown pneumatically from the tank truck into an on-location storage/delivery system (e.g., silo). The storage/delivery system may then deliver the bulk material onto a conveyor or into a hopper, which meters the bulk material into a blender tub.

Recent developments in bulk material handling operations involve the use of portable containers for transporting dry material about a well location. The containers can be brought in on trucks, unloaded, stored on location, and manipulated about the well site when the material is needed. The containers are generally easier to manipulate on location than a large supply tank trailer. The containers are eventually emptied by dumping the contents thereof onto a mechanical conveying system (e.g., conveyor belt, auger, bucket lift, etc.). The conveying system then moves the bulk material in a metered fashion to a desired destination at the well site.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
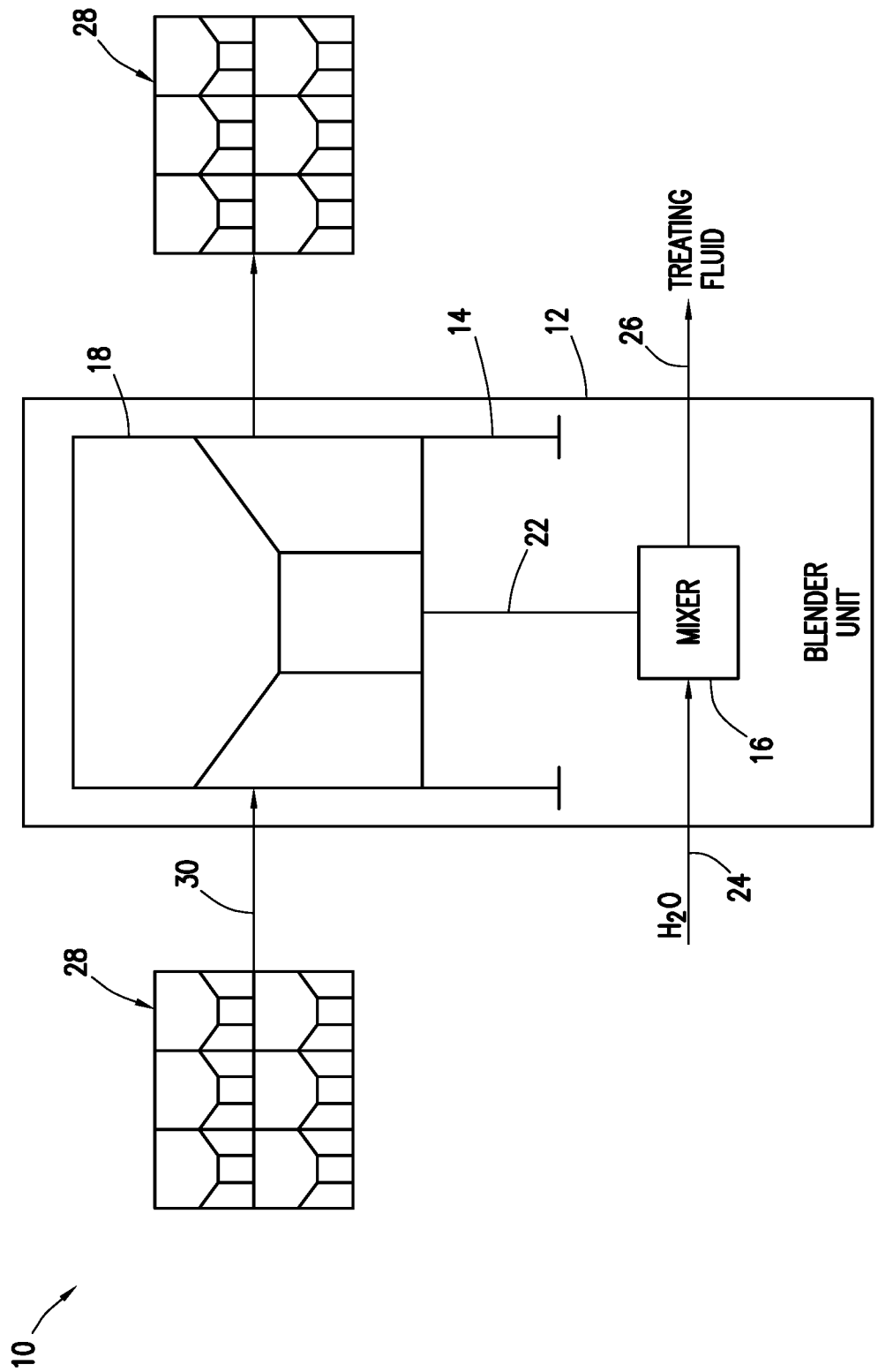
FIG. 1 is a schematic block diagram of a bulk material handling system including a bulk material container support frame integrated with a blender unit, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for efficiently managing bulk material (e.g., bulk solid or liquid material). Bulk material handling systems are used in a wide variety of contexts including, but not limited to, drilling and completion of oil and gas wells, concrete mixing applications, agriculture, and others. The disclosed embodiments are directed to systems and methods for efficiently moving bulk material into a mixer of a blender unit at a job site. The systems may include a blender unit with an integrated container support frame used to receive one or more portable containers of bulk material and a gravity feed outlet for outputting bulk material from the containers into the mixer of the blender unit. The disclosed techniques may be used to efficiently handle any desirable bulk material having a solid or liquid constituency including, but not limited to, sand, proppant, gel particulate, dry-gel particulate, diverting agent, liquid additives and others, or a mixture thereof.

In currently existing on-site bulk material handling applications, dry material (e.g., sand, proppant, gel particulate, or dry-gel particulate) may be used during the formation of treatment fluids. In such applications, the bulk material is often transferred between transportation units, storage tanks, blenders, and other on-site components via pneumatic transfer, sand screws, chutes, conveyor belts, and other components. Recently, a new method for transferring bulk material to a hydraulic fracturing site involves using portable containers to transport the bulk material. The containers can be brought in on trucks, unloaded, stored on location, and manipulated about the site when the material is needed. These containers generally include a discharge gate at the bottom that can be actuated to empty the material contents of the container at a desired time.

In existing systems, the containers are generally supported above a mechanical conveying system (e.g., moving belt, auger, bucket lift, etc.) prior to releasing the bulk material. The discharge gates on the containers are opened to release the bulk material via gravity onto the moving mechanical conveying system. The mechanical conveying system then directs the dispensed bulk material toward a desired destination, such as a hopper on a blender unit. Unfortunately, this process can release a relatively large amount of dust into the air and result in unintended material spillage. In addition, the mechanical conveying system is generally run on auxiliary power and, therefore, requires an external power source to feed the bulk material from the containers to the blender.

Some material handling systems involve the use of an elevated support structure that is portable and able to be positioned relative to a blender unit. Such portable support structures are designed to receive bulk material containers and route material from the containers directly into a hopper of the blender unit, for example. At this point, a mechanical conveyance mechanism (e.g., sand screw) of the blender meters the bulk material from the hopper to a mixer of the blender. Portable support structures can be used to provide relatively efficient material handling at well sites where conventional blender units are being used. However, this type of system can take an undesirable amount of time to rig up at the site, and require additional space at the site. It is desirable to provide still more efficient systems and methods for managing bulk material and performing blending operations at a well site.

The blender unit with the integrated container support frame disclosed herein is designed to address and eliminate the shortcomings associated with existing container handling systems. In the disclosed embodiments, the blender unit used to mix a treatment fluid is fully integrated into a mobile support structure used to handle containers of bulk material. That is, the blender unit may include both a bulk material mixing/blending portion (i.e., mixer) and an integrated bulk material container handling portion (i.e., container support frame). The blender unit may include the container support frame for receiving and holding one or more portable bulk material containers in an elevated position proximate the mixer of the blender unit, as well as one or more gravity feed outlets for routing the bulk material from the containers into the mixer. In some embodiments, the gravity feed outlets may be used to route bulk material from the containers directly into the mixer.

The disclosed container support frame of the blender unit may provide an elevated location for one or more bulk material containers to be placed while the proppant (or any other liquid or solid bulk material used in the fluid mixtures at the job site) is transferred from the containers into the mixer of the blender unit. The container support frame may elevate the bulk material containers to a sufficient height above the mixer, and the gravity feed outlet may route the bulk material from the elevated containers to the mixer. This may eliminate the need for any subsequent pneumatic or mechanical conveyance of the bulk material (e.g., via a separate conveying system) from the containers to the mixer. For example, the bulk material does not have to be mechanically conveyed from a blender hopper to the mixer via a mechanical lifting device (e.g., sand screw, conveyor, etc.). This may improve the energy efficiency and operational simplicity of bulk material handling operations at a job site, since no power sources are needed to move the material from the containers into the mixer of the blender unit. In addition, the integrated support frame and gravity feed outlet of the disclosed blender unit may simplify the operation of transferring bulk material, reduce material spillage, and decrease dust generation.

The disclosed blender unit with integrated container support frame may be a mobile unit for easy transportation about the site. The blender unit with the integrated container support frame may facilitate faster rig-up at the job site, compared to systems where these components are separate. When used in oil and gas applications, this equates to direct operational cost savings during well operations. In addition, by combining, integrating, and simplifying the blender equipment, the disclosed embodiments may decrease the total capital cost per spread at a well site, as well as the cost and time required to transport the equipment to location.

The disclosed embodiments may improve existing material handling and blending equipment by integrating the mobile container support structure with the blender unit. Due to this integration, several features and systems (e.g., hopper, sand screws, larger power pack) of currently existing blenders are no longer needed. In addition, the complex control system for the sand screws, and corresponding calibration, are no longer needed. As such, the integrated blender unit may be lighter weight, take up less space, and have a lower cost and complexity than existing blenders.

Turning now to the drawings, FIG. 1 is a block diagram of a bulk material handling system 10. The system 10 includes a blender unit 12 having an integrated container support frame 14 and a mixer 16. The system 10 also includes a container 18 elevated on the support frame 14 and holding a quantity of bulk material (e.g., solid or liquid treating material). In addition to the support frame 14 used for receiving and holding the container 18, the blender unit 12 may also include a gravity feed outlet 22 for directing bulk material away from the container 18. The outlet 22 may be coupled to and extending from the container support frame 14. The outlet 22 may utilize a gravity feed to provide a controlled, i.e. metered, flow of bulk material from the container 18 into the mixer 16 of the blender unit 12. The mixer 16 may be disposed beneath the container support frame 14 at a position proximate the ground.

Water and other additives may be supplied to the mixer 16 (e.g., mixing compartment) through an inlet 24. The bulk material and water may be mixed in the mixer 16 to produce (at an outlet 26) a fracing fluid, a mixture containing multiple types of proppant, proppant/dry-gel particulate mixture, sand/sand-diverting agents mixture, cement slurry, drilling mud, a mortar or concrete mixture, or any other fluid mixture for use on location. The outlet 26 may be coupled to a pump for conveying the treating fluid to a desired location (e.g., a hydrocarbon recovery well) for a treating process. It should be noted that the disclosed system 10 may be used in other contexts as well. For example, the bulk material handling system 10 may be used in concrete mixing operations (e.g., at a construction site) to dispense aggregate from the container 18 through the outlet 22 into a concrete mixing apparatus (mixer 16). In addition, the bulk material handling system 10 may be used in agriculture applications to dispense grain, feed, seed, or mixtures of the same.

It should be noted that the disclosed container 18 may be utilized to provide bulk material for use in a variety of treating processes. For example, the disclosed systems and methods may be utilized to provide proppant materials into fracture treatments performed on a hydrocarbon recovery well. In other embodiments, the disclosed techniques may be used to provide other materials (e.g., non-proppant) for diversions, conductor-frac applications, cement mixing, drilling mud mixing, and other fluid mixing applications.

As illustrated, the container 18 may be elevated above the mixer 16 via the container support frame 14. The support frame 14 (integrated with the blender unit 12) is designed to elevate the container 18 above the level of the mixer 16 to allow the bulk material to gravity feed from the container 18 to the mixer 16. This way, the container 18 is able to sit on the support frame 14 and output bulk material directly into the mixer 16 via the gravity feed outlet 22 of the blender unit 12.

Although shown as supporting a single container 18, other embodiments of the blender unit 12 with the integrated support frame 14 may be configured to support multiple containers 18. The exact number of containers 18 that the support frame 14 can hold may depend on a combination of factors such as, for example, the volume, width, and weight of the containers 18 to be disposed thereon, and the overall size requirements for the blender unit 12.

In any case, the container(s) 18 may be completely separable and transportable from the support frame 14, such that any container 18 may be selectively removed from the frame 14 and replaced with another container 18. That way, once the bulk material from the container 18 runs low or empties, a new container 18 may be placed on the support frame 14 to maintain a steady flow of bulk material to the mixer 16 of the blender unit 12. In some instances, the container 18 may be closed before being completely emptied, removed from the support frame 14, and replaced by a container 18 holding a different type of bulk material to be provided to the mixer 16. Optionally, size and height permitting, another container 18 can be placed on top of an active container 18 to refill this active container 18.

A portable bulk storage system 28 may be provided at the site for storing one or more additional containers 18 of bulk material to be positioned on the support frame 14 integrated into the blender unit 12. The bulk material containers 18 may be transported to the desired location on a transportation unit (e.g., truck). The bulk storage system 28 may be the transportation unit itself or may be a skid, a pallet, or some other holding area. One or more containers 18 of bulk material may be transferred from the storage system 28 onto the support frame 14, as indicated by arrow 30. This transfer may be performed by lifting the container 18 via a hoisting mechanism, such as a forklift, a crane, or a specially designed container management device.

When the one or more containers 18 are positioned on the container support frame 14 of the blender 12, discharge gates on one or more of the containers 18 may be opened, allowing bulk material to flow from the containers 18 into the gravity feed outlet 22 of the blender unit 12. The outlet 22 may then route the flow of bulk material into the mixer 16.

After one or more of the containers 18 on the support frame 14 are emptied, the empty container(s) 18 may be removed from the support frame 14 via a hoisting mechanism. In some embodiments, the one or more empty containers 18 may be positioned on another bulk storage system 28 (e.g., a transportation unit, a skid, a pallet, or some other holding area) until they can be removed from the site and/or refilled. In other embodiments, the one or more empty containers 18 may be positioned directly onto a transportation unit for transporting the empty containers 18 away from the site. It should be noted that the same transportation unit used to provide one or more filled containers 18 to the location may then be utilized to remove one or more empty containers 18 from the site.

Figure 2:
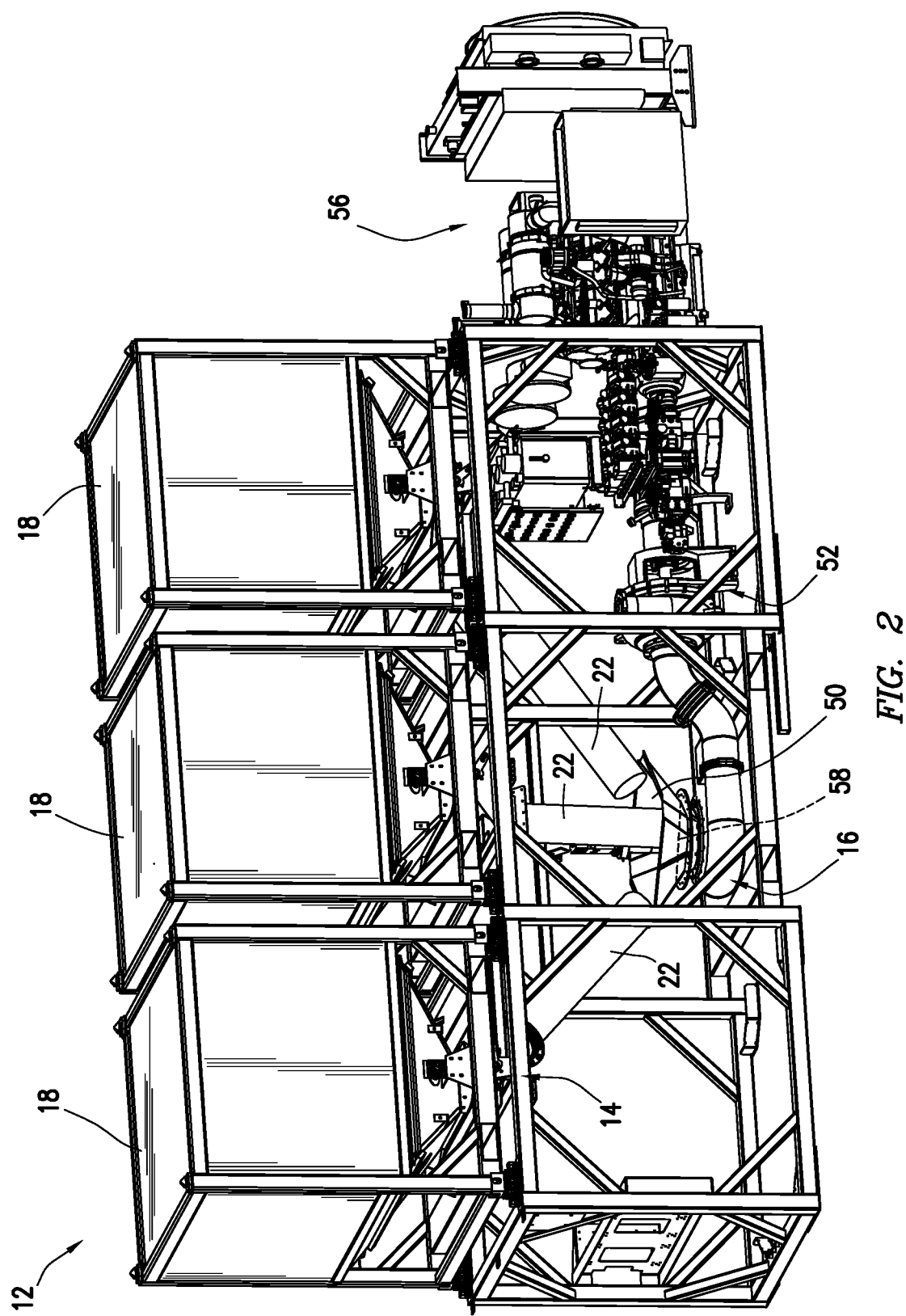
FIG. 2 is a perspective view of a blender unit with an integrated container support frame holding a plurality of containers to output bulk material directly into a mixer of the blender unit, in accordance with an embodiment of the present disclosure.

FIG. 2 illustrates an embodiment of the blender unit 12 with the integrated container support frame 14. In addition to the container support frame 14, the blender unit 12 may also include one or more gravity feed outlets 22 (e.g., chutes) coupled to the support frame 14, a hopper 50, the mixer 16, one or more pumps 52 (e.g., boost pumps), a control system (not shown), a power source 56, or some combination thereof. The blender unit 12 with the integrated support frame 14 may be formed as a mobile unit that is transportable to a desired location. This mobile blender unit 12 may be constructed in a trailer configuration, as shown, for use in land-based operations. In other embodiments, the mobile blender unit 12 may be constructed as a skid-based unit to enable transportation to and use in off-shore operations.

In the illustrated embodiment, the container support frame 14 is designed to receive and support multiple containers 18. Specifically, the support frame 14 may be sized to receive and support up to three portable containers 18. The container support frame 14 may include several beams connected together (e.g., via welds, bolts, or rivets) to form a continuous group of cubic or rectangular shaped supports coupled end to end. For example, in the illustrated embodiment the support frame 14 generally includes one continuous elongated rectangular body with three distinct cubic/rectangular supports extending along a longitudinal axis of the blender unit 12. The container support frame 14 may include additional beams that function as trusses to help support the weight of the filled containers 18 disposed on the frame 14. Other shapes, layouts, and constructions of the container support frame 14 may be used in other embodiments. In addition, other embodiments of the blender unit 12 may include a container support frame 14 sized to receive other numbers (e.g., 1, 2, 4, 5, 6, 7, or more) portable containers 18.

As illustrated, the hopper 50 may be disposed above and mounted to the mixer 16, and the gravity feed outlets 22 may extend downward into the hopper 50. The hopper 50 may function to funnel bulk material exiting the containers 18 via the gravity feed outlets 22 to an inlet of the mixer 16. In some embodiments of the blender unit 12, a metering gate 58 may be disposed at the bottom of the hopper 50 and used to meter the flow of bulk material from the containers 18 into the mixer 16. In other embodiments, the metering gate 58 may be disposed at another position of the blender unit 12 along the bulk material flow path between the containers 18 and the mixer 16. For example, one or more metering gates 58 may be disposed along the gravity feed outlets 22.

In some embodiments, the mixer 16 may be a "tub-less" mixer. That is, the mixer 16 may be a short, relatively small-volume mixing compartment. An example of one such mixer 16 is described in detail with respect to FIG. 3. As illustrated in FIG. 2, the mixer 16 may be disposed at or near the ground level of the blender unit 12. This sizing and placement of the mixer 16 may enable the blender unit 12 to route bulk material via gravity into the mixer 16, while maintaining the support frame 14 at a height where a forklift or specialized container transport system is able to easily position the containers 18 onto and remove the containers 18 from the support frame. In existing blender systems with a much larger full-sized mixing tub, any support structure built high enough to direct bulk material from containers directly into the tub would be too high for container transport systems to reach.

Figure 3:
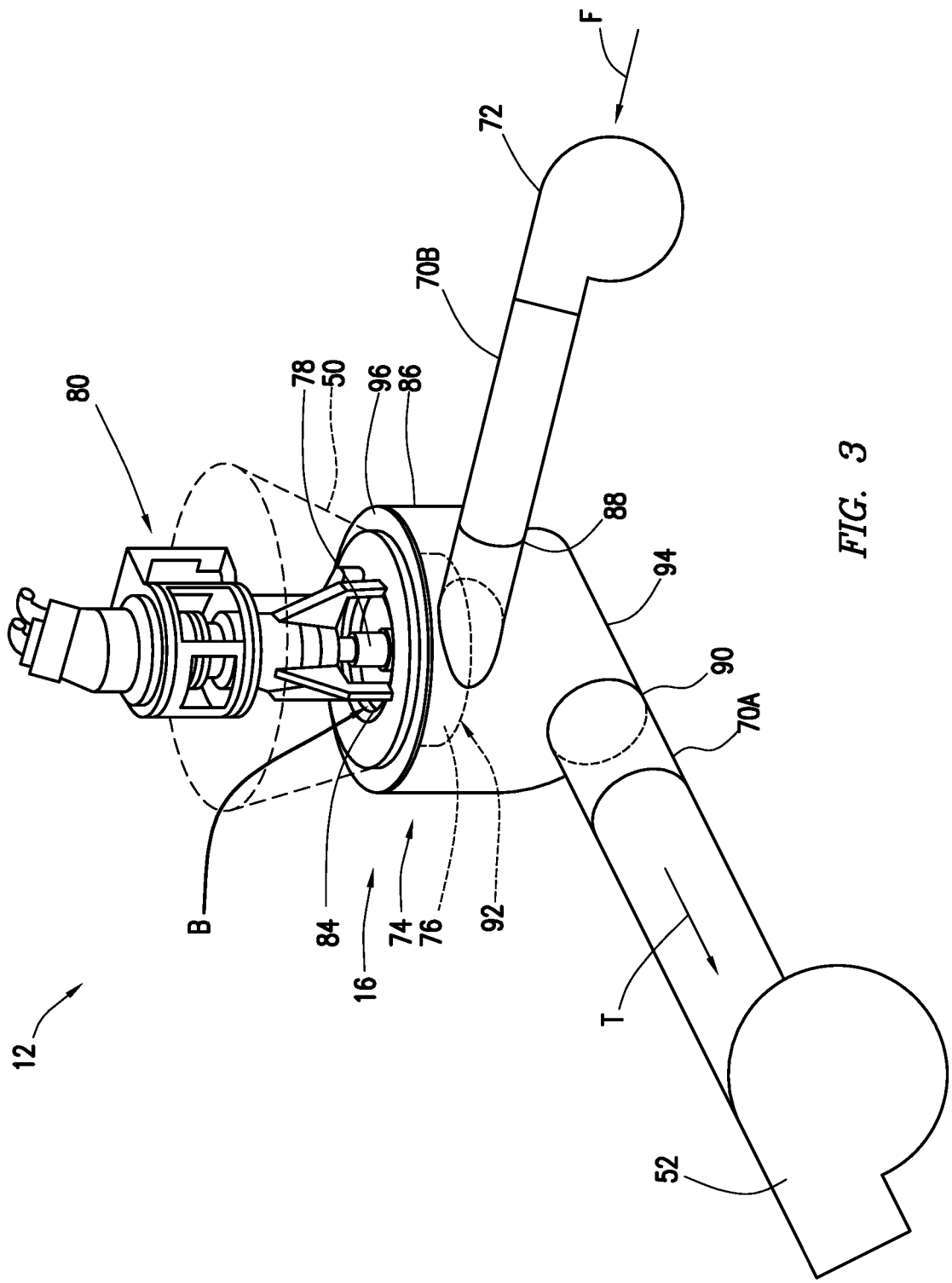
FIG. 3 is a perspective view of a mixer that may be used in the blender unit of FIG. 2, in accordance with an embodiment of the present disclosure.

Turning now to FIG. 3, the mixer 16 is generally designed to impart energy to bulk material, B, and blend the bulk material with a fluid, F. The mixer 16 may be coupled via fluid conduits 70 to a suction centrifugal pump 72 used to impart energy to the fluid for delivery to the mixer 16, and to a discharge centrifugal pump 52 used to impart energy to the treatment fluid, T, created in the mixer 16. The suction pump 72 and/or the discharge pump 52 may be included in the blender unit 12. In some embodiments, the suction pump 72 may be disposed on a separate fluids management trailer and coupled to the mixer 16 on the blender unit 12 via a selectively attachable fluid conduit 70B.

In the illustrated embodiment, the mixer 16 may include a housing 74 with an expeller 76 mounted for rotation therein. The expeller 76 may be attached by a bolt or pin to a rotating shaft 78 powered, for example, by an attached motor 80 coupled to a bearing housing. The motor 80 may receive power (electrical, mechanical, or hydraulic) from the power source (e.g., 56 of FIG. 2) of the blender unit 12. The bulk material B may be input to the mixer 16 at a material inlet 84 and may be directed or fed through the hopper 50 and the one or more gravity feed outlets (e.g., 22) of the blender unit 12, as described above. The shaft 78 may be coupled to the eye of the expeller 76, creating a central hub positioned below the material inlet 84. The housing 74 may include a volute casing 86 having the material inlet 84, a fluid inlet 88, and a treatment fluid outlet 90. The fluid inlet 88 may deliver incoming fluid at the approximate height of a base plate 92 of the expeller 76. The treatment fluid outlet 90 may extend from proximate a bottom 94 of the housing 74, as shown.

The housing 74 may include a housing top 96 and the housing bottom 94, as shown, coupled to the volute casing wall 86. The housing top 96 may follow the contour of the top of the expeller 76, defining an expeller upper clearance therebetween. The housing 74, in some embodiments, may house approximately a three-barrel volume. The excess volume may allow for a residual volume to permit recovery from fluid or bulk material supply irregularities. It should be noted that other shapes, sizes, and general arrangements of the mixer 16 may be utilized in other embodiments of the blender unit 12.

Turning back to FIG. 2, the power supply 56 may be used to supply hydraulic, mechanical, or electrical power (or any combination thereof) to the blender unit 12 for performing various operations. For example, the power supply 56 may provide power necessary to operate the pump 52, the mixer 16, the control system, the metering gate 58, and/or actuators used to open/close discharge gates of the containers 18 disposed on the frame 14, among others. In some embodiments, the power supply 56 may include an engine. The power supply 56 (or power pack) may be integral with the blender unit 12, as shown. In other embodiments, power may be provided to the blender unit 12 via an external hydraulic or electrical power source selectively coupled to the blender unit 12. This would be particularly useful at well site locations where a large amount of equipment on location is electrically powered (such as off-shore), or if the electrical generator units used by a drilling rig were left on location for the hydraulic fracturing treatment.

Having now described the equipment that makes up the illustrated blender unit 12, a description of the blending operations that may be performed by the blender unit 12 will be provided. First, the bulk material containers 18 may be placed on the support frame 14 of the blender unit 12 above the mixer 16. Bulk material may then be directed from the one or more containers 18 into the mixer 16 via the gravity feed outlet 22 of the blender unit 12. The gravity feed outlets 22 may each include a chute positioned so that the upper end of the chute is disposed beneath a discharge gate of the one or more containers 18. In the illustrated embodiment, the blender unit 12 may include multiple gravity feed outlets 22, one corresponding to each container disposed on the support frame 14. In such instances, the blender unit 12 may include multiple individual hoppers coupled to the support frame 14 beneath a location of the discharge gate of each container 18 for funneling bulk material from the container 18 into the corresponding outlet 22. The hopper 50 above the mixer 16 may be sized accordingly to receive the multiple gravity feed outlets 22 while maintaining a desired angle of repose for choking the bulk material flow.

In other embodiments, however, the blender unit 12 may include a single gravity feed outlet 22 for routing material from all three containers 18 into the mixer 16. In this instance, the blender unit 12 may also include a hopper (not shown) coupled to the support frame 14 and extending beneath all of the containers 18 for funneling material from the multiple containers 18 into the single outlet 22. It may be desirable to route bulk material from the containers 18 to the mixer 16 via a single gravity feed outlet 22 when the mixer 16 used in the blender unit 12 is relatively small, with limited room in the hopper 50 for receiving more than one outlet 22.

In each embodiment of the blender unit 12, the one or more gravity feed outlets 22 may be positioned such that the lower end of the chutes are each disposed fully within the inlet at the top of the mixer 16, or fully within the hopper 50 extending above the mixer 16. This allows the gravity feed outlets 22 to provide bulk material from all of the containers positioned on the support frame 14 into the mixer 16 of the blender unit 12 at the same time.

The one or more outlets 22 enable bulk material to flow from the containers 18 into the hopper 50 via gravity. Once the material begins to flow in this manner, the flow may become choked at the hopper 50 due to an angle of repose of the material within the hopper 50. As bulk material is metered from the hopper 50 into the mixer 16 (e.g., via metering gate 58), additional bulk material is able to flow via gravity into the hopper 50 directly from the one or more outlets 22. In this way, the material flow is self-regulating, and additional material is let out of the containers 18 only as it is removed from the bottom of the hopper 50.

Gravity feeding bulk material directly from the containers 18 on the support frame 14 of the blender unit 12 into the mixer 16 may minimize an amount of dust generated during bulk material handling operations at the location. Specifically, the choke feed of bulk material through the outlets 22 and into the hopper 50 coupled to the mixer 16 may reduce an amount of dust generated at a well site, as compared to existing mechanical conveying systems. In some embodiments, it may be desirable for the blender unit 12 to include a curtain or apron disposed around the mixer 16 and/or hopper 50 to further minimize or contain dust generated by the bulk material flow through the blender unit 12.

The metering gate 58 at the outlet of the hopper 50 (or at some other location along the bulk material handling portion of the blender unit 12) may be opened/closed a desired amount to regulate the flow of bulk material into the mixer 16. The position of the metering gate 58 may be controlled via signals provided from the control system based on a predetermined or desired concentration of bulk material within the treatment mixture (e.g., well treatment mixture). The bulk material may be mixed in the tub-less mixer 16 with water, other chemical additives, gels, etc. to produce the desired treatment fluid.

The resulting treatment fluid may then be passed to the one or more pumps 52 of the blender unit 12, which in some embodiments may pump the treatment fluid directly to a wellhead. If hydraulic fracturing is being performed at the well site, the pump(s) 52 on the blender unit 12 may not operate at a sufficiently high pressure for providing the fracture treatment. In such instances, the pump(s) 52 may pass the treatment fluid from the mixer 16 of the blender unit 12 toward a high pressure pumping unit having high-pressure pumps to transfer the treatment fluid at a desired pressure to the wellhead.

In existing container-based bulk material handling systems, the bulk material is delivered from containers (often via a separate conveyor system) into a large hopper of a blender unit. Conventional blender units typically include one or more mechanical lifting device, such as sand screws or inclined conveyors, for metering and lifting the bulk material out of the large hopper and into a large mixing tub of the blender. The disclosed blender unit 12, however, includes a fully integrated container support frame 14 for receiving the containers 18 of bulk material, as well as one or more gravity feed outlets 22 for routing bulk material into a small, ground-level mixing vessel (i.e., mixer) 16. The blender unit 12, therefore, does not need any sand screws or other mechanical conveying system for lifting/delivering the bulk material from a hopper into a separate mixing tub. Accordingly, the disclosed blender unit 12 does not include any sand screws or similar mechanical lifting systems, and this reduces the equipment complexity of the blender unit 12 compared to existing blenders.

The disclosed blender unit 12 may provide a relatively large connected capacity of bulk material for use in mixing well treatment fluids, compared to existing blenders. This is because the blender unit 12 is designed to hold one or more containers 18 full of bulk material on the support frame 14 and to connect the containers 18 to the mixer 16 via one or more gravity feed outlets 22. This arrangement may decrease the number of failure mechanisms within the blender unit 12 as compared to existing blenders, since no sand screws or other mechanical conveying systems are needed. Typically, if a sand screw on a blender stops functioning properly, the mixing tub of the blender can no longer receive bulk material needed for the desired well treatment, and the treatment must be stopped. However, using the disclosed blender unit 12, there are no sand screws that might malfunction. Instead, there is a relatively large amount of bulk material available in the containers 18 disposed on the support frame 14 that is continuously connected to the mixer 16 and routed into the mixer via a force of gravity.

In addition, by not including sand screws therein, the blender unit 12 may operate more efficiently than existing blenders. Since no sand screws are used to convey bulk material from a hopper of the blender unit 12 to the mixer 16, the blender unit 12 is able to operate via fewer steps and with fewer transfer points where dust generation may occur. Further, since the blender unit 12 does not have sand screws or other mechanical conveying systems that must be powered, the blender unit 12 may operate with a lower horsepower requirement for the power source 56 than existing blenders. Therefore, the blender unit 12 may utilize a smaller power source 56 than those required to power existing systems, making the blender unit 12 lower weight and easier to transport.

Figure 4:
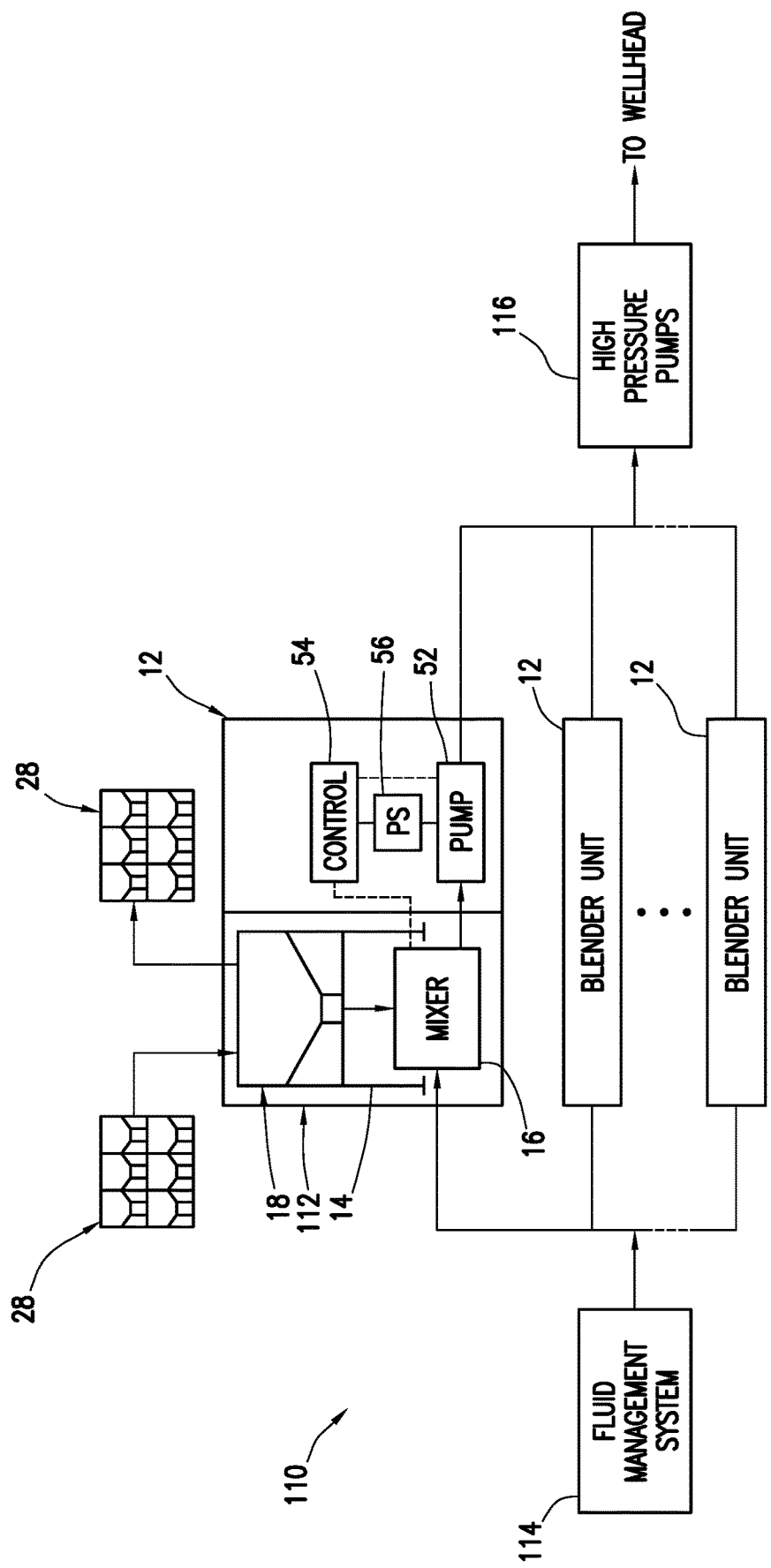
FIG. 4 is a schematic block diagram of an embodiment of a blender unit with an integrated container support frame being used with various other well treatment equipment at a well site, in accordance with an embodiment of the present disclosure.

FIG. 4 illustrates another embodiment of a system 110 for performing a well treatment at a well site using the disclosed blender unit 12. As illustrated, the blender unit 12 includes the integrated support frame 14 for holding one or more containers 18 of bulk material, one or more gravity feed outlets 22, and the mixer 16. These components are each provided in a bulk material handling/mixing portion 112 of the blender unit 12. As described above with reference to FIG. 1, the containers 18 may be selectively moved from a bulk storage system 28 onto the support frame 14 of the blender 12, and removed from the support frame 14 for disposal onto another bulk storage system 28 after being emptied.

The blender unit 12 may also include other features described above with reference to FIG. 2, such as one or more pumps 52, a control system 54, and a power source 56. The control system 54 may be communicatively coupled to the pump 52 to control a pumping pressure of the fluid mixture exiting the blender unit 12. The control system 54 may also be communicatively coupled to the mixer 16 for controlling a rotational speed (e.g., via motor 80 of FIG. 3) of the rotating expeller (e.g., 76 of FIG. 3) to control mixing. Although not shown, the control system 54 may also be communicatively coupled to a metering gate (e.g., 58 of FIG. 2) to regulate the amount of bulk material provided to the mixer 16 and, consequently, control the concentration of the treatment fluid formed in the mixer 16.

In some embodiments, the blender unit 12 may also include a mulling device 113 disposed between the container 18 and the mixer 16. The mulling device 113 may be disposed between the gravity feed outlet 22 and the mixer 16, as illustrated, for conditioning the bulk material being routed from the container 18 into the mixer 16. The conditioning of the bulk material may include applying a coating or liquid additive to the bulk material such as, for example, SandWedge®, Expedite®, gel breaker, surfactant, or a similar product for mixing into or coating the bulk material. It may be desirable to apply the liquid additive via a mulling device 113 disposed downstream of both the gravity feed outlet 22 and the metering gate (e.g., 58 of FIG. 2), so that the liquid additive does not interfere with the feeding and metering of the bulk material from the container 18 to the mixer 16. The conditioning of the bulk material may also include blending multiple types of dry bulk materials in the mulling device 113. The different types of dry bulk materials may be routed from multiple containers 18 positioned on the support frame 14 of the blender unit 12 into the mulling device 113 before being routed to the mixer 16. The different types of dry bulk materials may also be routed from at least one container 18 positioned on the support frame 14 and an alternative dry additive source (not shown).

The system 110 may include additional components that are separate from but operationally coupled to the blender unit 12 to generate and provide the desired fluid treatment to the wellhead. These components may include, for example, a fluid management system 114 and one or more high pressure pumps 116, among others. As illustrated, multiple blender units 12 in accordance with disclosed embodiments may be positioned in parallel and coupled between the fluid management system 114 and the high pressure pumps 116.

The fluid management system 114 may include any desirable type and number of fluid storage components, pumps (e.g., pump 72 of FIG. 3), etc. for directing desired fluids to the mixer 16 on the blender unit 12. In some embodiments, the fluid management system 114 may include a ground water source, a pond, one or more frac tanks, a fluids management trailer, and/or components used to mix gels or acids into the fluid being provided to the mixer 16. The high pressure pumps 116 may be coupled to an output of the pumps 52 on the blender unit 12 and used to provide the treatment fluid from the blender unit 12 to the wellhead at a high enough pressure for fracturing operations (or other operations where a high pressure fluid mixture is desired).

As illustrated, multiple blender units 12 may be coupled in parallel between the fluid management system 114 and the high pressure pumps 116. This arrangement enables the one or more of the blender units 12 to function as back-up units to provide back-up mixing and pumping of treatment fluid in the event of an operational failure on a primary blender unit 12. The multiple blender units 12 may provide redundancy and a large connected capacity for generating and pumping treatment fluid downhole.

Although the present disclosure and its advantages have been described in detail, it should be understood that various changes, substitutions and alterations can be made herein without departing from the spirit and scope of the disclosure as defined by the following claims.

What is claimed is:

1. A method, comprising:
   transporting a blender unit on a single trailer or skid to a work site, wherein the blender unit comprises a mixer, a container support frame, and one or more gravity feed outlets;
   transporting one or more portable containers of bulk material from a first location away from the blender unit to a second location on the container support frame of the blender unit, wherein the container support frame is located proximate the mixer of the blender unit;
   receiving the one or more portable containers of bulk material onto the container support frame while the blender unit is at the work site;
   feeding the bulk material from the one or more portable containers into the mixer via the one or more gravity feed outlets; and
   mixing the bulk material with a fluid to generate a well treatment fluid via the mixer.

2. The method of claim 1, further comprising choking a flow of bulk material from the one or more gravity feed outlets via a hopper disposed over the mixer.

3. The method of claim 1, further comprising regulating a flow of bulk material from the one or more portable containers to the mixer via a metering gate.

4. The method of claim 1, further comprising pumping the well treatment fluid from an outlet of the mixer to a wellhead.

5. The method of claim 1, further comprising:
   pumping the well treatment fluid from an outlet of the mixer to a high pressure pump via a pump disposed in the blender unit; and
   pumping the well treatment fluid into a wellhead via the high pressure pump.

6. The method of claim 1, further comprising conditioning the bulk material being fed from the one or more portable containers into the mixer, via a mulling device of the blender unit.

7. The method of claim 1, wherein the one or more containers are physically detached from the one or more gravity feed outlets.

8. The method of claim 1, wherein the one or more portable containers are at least partially filled with bulk material during transportation of the one or more portable containers of bulk material from the first location to the second location.

9. A method, comprising:
   transporting a blender unit on a single trailer or skid to a work site, wherein the blender unit comprises a mixer, a container support frame, and one or more gravity feed outlets;
   receiving one or more portable containers of bulk material onto the container support frame of the blender unit while the blender unit is at the work site, wherein the container support frame is located proximate the mixer of the blender unit;
   feeding the bulk material from the one or more portable containers into the mixer via the one or more gravity feed outlets, wherein the one or more containers are physically detached from the one or more gravity feed outlets; and
   mixing the bulk material with a fluid to generate a well treatment fluid via the mixer.

10. The method of claim 9, further comprising choking a flow of bulk material from the one or more gravity feed outlets via a hopper disposed over the mixer.

11. The method of claim 9, further comprising regulating a flow of bulk material from the one or more portable containers to the mixer via a metering gate.

12. The method of claim 9, further comprising pumping the well treatment fluid from an outlet of the mixer to a wellhead.

13. The method of claim 9, further comprising:
   pumping the well treatment fluid from an outlet of the mixer to a high pressure pump via a pump disposed in the blender unit; and
   pumping the well treatment fluid into a wellhead via the high pressure pump.

14. The method of claim 9, further comprising conditioning the bulk material being fed from the one or more portable containers into the mixer, via a mulling device of the blender unit.

15. The method of claim 9, further comprising transporting the one or more portable containers to the container support frame while the one or more portable containers are at least partially filled with bulk material.

16. A method, comprising:
   transporting a blender unit on a single trailer or skid to a work site, wherein the blender unit comprises a mixer, a container support frame, and one or more gravity feed outlets;
   transporting one or more portable containers, while the one or more portable containers are at least partially filled with bulk material, to the container support frame of the blender unit;
   receiving the one or more portable containers of bulk material onto the container support frame while the blender unit is at the work site;
   feeding the bulk material from the one or more portable containers into the mixer via the one or more gravity feed outlets; and
   mixing the bulk material with a fluid to generate a well treatment fluid via the mixer.

17. The method of claim 1, wherein the blender unit further comprises a pump disposed proximate the mixer, the method further comprising:
   via the pump, pumping the well treatment fluid from the mixer to a location away from the blender unit.

18. The method of claim 17, wherein both the mixer and the pump are located under an upper surface of the container support frame.

19. The method of claim 2, further comprising regulating the flow of bulk material into the mixer via a metering gate located at a bottom of the hopper.

20. The method of claim 10, further comprising regulating the flow of bulk material into the mixer via a metering gate located at a bottom of the hopper.

* * * * *